United States Patent
Misawa et al.

(10) Patent No.: US 6,908,220 B2
(45) Date of Patent: Jun. 21, 2005

(54) VEHICLE LAMP

(75) Inventors: Akihiro Misawa, Nishikasugai-gun (JP); Hiroshi Ito, Nishikasugai-gun (JP); Osamu Yamanaka, Nishikasugai-gun (JP); Masanori Nagata, Nishikasugai-gun (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 10/179,370

(22) Filed: Jun. 26, 2002

(65) Prior Publication Data

US 2003/0012034 A1 Jan. 16, 2003

(30) Foreign Application Priority Data

Jul. 16, 2001 (JP) ..................................... P2001-215277
Aug. 9, 2001 (JP) ..................................... P2001-242820

(51) Int. Cl.[7] .............................................. B60Q 1/44
(52) U.S. Cl. ...................... 362/541; 362/231; 362/545; 362/84
(58) Field of Search .................................. 362/231, 541, 362/545, 542, 543, 544, 540, 84, 510, 499, 800, 34, 293, 230

(56) References Cited

U.S. PATENT DOCUMENTS

| | | | | |
|---|---|---|---|---|
| 2,459,693 A | * | 1/1949 | Gordon | 362/293 |
| 4,808,968 A | * | 2/1989 | Caine | 340/479 |
| 5,709,453 A | * | 1/1998 | Krent et al. | 362/496 |
| 6,250,788 B1 | * | 6/2001 | Muller | 362/541 |
| 6,260,988 B1 | * | 7/2001 | Misawa et al. | 362/276 |
| 6,499,852 B1 | * | 12/2002 | Kino et al. | 362/489 |

FOREIGN PATENT DOCUMENTS

JP 11-096808 4/1999

* cited by examiner

*Primary Examiner*—Thomas M. Sember
*Assistant Examiner*—Bao Q. Truong
(74) *Attorney, Agent, or Firm*—McGinn & Gibb, PLLC

(57) ABSTRACT

A vehicle rear lamp including first light-emitting device emitting a red light, and second light-emitting device emitting a light different from the red light, preferably blue or green, wherein the first and second light-emitting devices are provided in a region for stop lamp indication.

22 Claims, 8 Drawing Sheets

VEHICLE LAMP

The present application is based on Japanese Patent Applications No. 2001-215277 and No. 2001-242820, the entire contents of which are incorporated herein by reference.

BACKGROUND OF THE INVENTION

The present invention relates to a vehicle lamp and a method for indicating the vehicle lamp. Particularly to a vehicle lamp provided with a plurality of LEDs or a combination of at least one LED for emitting short-wave light and a fluorescent material. The vehicle lamp can be adapted particularly to a rear combination lamp of a vehicle.

In a rear combination lamp disposed in a rear portion of a vehicle, bulbs are generally used as light sources. The rear combination lamp has a tail stop lamp portion, a turn lamp portion, and a back lamp portion. Light emitted from the bulbs is radiated out through lenses (filters) disposed in these portions and decorated with indication colors respectively. The following problems arise from the use of such bulbs as light sources. Firstly, much electric power is consumed. Secondly, the life of each bulb is so short that the bulb must be frequently exchanged for a new one. Thirdly, each of indication portions such as a tail stop lamp portion needs a color filter (color-decorated lens). Therefore, a rear combination lamp has been proposed as a system using LEDs as light sources instead of the bulbs. For example, there has been proposed a stop lamp using LEDs as its light sources to thereby perform stop lamp indication on the basis of the color of light emitted from the LEDs per se (Japanese Patent Publication No. JP-11-96808A). By the use of such LEDs, the problems peculiar to the bulbs can be solved. When such an LED light source is used, a plurality of LEDs are required and disposed, for example, in the form of a matrix so that the plurality of LEDs can cover the whole surface of a lens because there is the existing situation that equal luminance to that obtained by one bulb cannot be obtained by one LED.

Meanwhile, stop lamps of a vehicle are provided to signify deceleration or stop to a vehicle in the rear, and required to have high visibility in terms of safety. The visibility is, however, lowered in a bad condition for field of view, for example, in the case where fog is generated in the night. Moreover, when a driver who is driving a vehicle does not focus on a rear portion of a vehicle in the front, for example, in the case where the driver shifts the eye view toward another direction from the traveling direction of the vehicle, the visibility of stop lamps of the vehicle in the front is lowered. As described above, there is still room for improvement in the related-art stop lamp indication using a single color of red because it can be hardly said that the visibility in the stop lamp indication is sufficient for various running situations.

Moreover, when LEDs are used in a vehicle rear lamp in the above manner, there has been a problem that design characteristic becomes poor because light emitted in the form of points on a surface of a lens is observed and the light on the whole surface cannot be made uniform in luminance due to the luminance difference between the LEDs.

SUMMARY OF THE INVENTION

In order to solve the problems, an object of the invention is to improve visibility of the vehicle lamp indication in view of safety and design. In addition, the invention provides a vehicle lamp which emits light uniformly on the whole surface of a lens to thereby make design characteristic excellent.

The present inventors have eagerly examined the configuration of a stop lamp and the method for indicating the stop lamp in order to achieve the foregoing object. As a result, it has been found that when emission of red light is used in combination with emission of blue or green light for performing stop lamp indication, color rendering characteristic of the stop lamp is improved so that stop lamp indication can be performed effectively. It has been also found that when emission of the blue or green light is used in combination, visibility of the stop lamp is particularly improved in a situation that the stop lamp is visually recognized in peripheral view. It is conceived that these findings are concluded thus because visibility of blue or green light in such peripheral view is particularly higher than that of red light. Moreover, because red light is the original emission color for stop lamp indication, it is conceived that red light is preferably used for recognition of the color and shape of the stop lamp in front view. On the other hand, because blue or green light exhibits high visibility (brightness) particularly in peripheral view, it is conceived that the blue or green light is preferably used for improvement in visibility of the stop lamp particularly in peripheral view. This invention is based on these findings and configured as follows.

A vehicle rear lamp includes a first light-emitting device emitting a red light, and a second light-emitting device emitting a light other than the red light, wherein the first and second light-emitting devices are provided in a region for performing lamp indication.

Preferably, the second light-emitting device emits either one of blue light and green light.

In the vehicle rear lamp configured as described above, red light is emitted from the first light-emitting device and light other than red, namely blue or green for example, is emitted from the second light-emitting device, so that lamp indication is performed by the two kinds of light. Moreover, the red light is made more conspicuous by contrast between the red light and the blue or green light, so that visibility is enhanced. As a result, effective stop lamp indication is performed. In addition, because the blue or green light is used as light exhibiting high visibility particularly in peripheral view, the visibility of the stop lamp is improved in a situation that the stop lamp is not viewed directly (that is, in a situation that the stop lamp is visually recognized in peripheral view). As a result, effective stop lamp indication is performed.

Preferably, the second light-emitting device emits light in a wavelength range of from 450 nm to 540 nm. Further preferably, the second light-emitting device emits light in a wavelength range of from 450 nm to 500 nm. When light in such a wavelength range is used, visibility of red light emitted from the first light-emitting device is improved more greatly. In addition, visibility in peripheral view is improved more greatly.

Preferably, the first light-emitting device is provided in an edge portion of a region for performing stop lamp indication in the vehicle rear lamp. When a part of the first light-emitting device is provided thus, other part of the first light-emitting device maybe provided additionally in the other portion than the edge portion without causing any problem. For example, while a part of the first light-emitting device may be provided in an edge portion of the region for performing stop lamp indication, the other part of the first light-emitting device may be also mixed with the second light-emitting device so as to be provided in the other portion than the edge portion.

Particularly, the first light-emitting device may be provided so that the outer edge of the region for performing stop lamp indication can be indicated luminously by light emitted from the first light-emitting device. According to this configuration, a viewer can visually recognize the shape of the region for performing stop lamp indication by red light which is the original emission color for stop lamp indication, so that visibility in stop lamp indication can be improved. An example of the provision of the first light-emitting device in the edge portion of the region for performing stop lamp indication is the case where the first light-emitting device is provided in an outer circumferential portion of a stop lamp portion (tail stop lamp portion) in a rear combination lamp. The first light-emitting device, however, need not be provided in the whole outer circumference of the stop lamp portion. For example, the first light-emitting device may be provided only in the outer circumference of a part region of the stop lamp portion. Specifically, the first light-emitting device may be provided, for example, along an upper outer edge of the stop lamp portion.

The first and second light-emitting devices may be designed so that the second light-emitting device is surrounded by the first light-emitting device. For example, in the condition that second light-emitting device is provided circularly in the center portion of the region for performing stop lamp indication, the first light-emitting device may be provided so as to surround the second light-emitting device. According to this arrangement, a portion for emitting blue or green light is present, like an island, in a portion for emitting red light in the stop lamp indication region. The second light-emitting device may be provided in a plurality of portions. In this case, a plurality of portions for emitting blue or green light are scattered in a portion for emitting red light.

Light sources used in the first and second light-emitting devices are not particularly limited in kind. For example, light-emitting diodes (referred to as "LEDs" in this specification) can be preferably used as the light sources. That is, it is preferable that red LEDs are used as the first light-emitting devices whereas blue or green LEDs are used as the second light-emitting devices. Particularly, it is preferable that at least the second light-emitting devices are constituted by LEDs. Because LEDs are small in size compared with the bulb, LEDs have advantages as follows. That is, the space for mounting the LEDs is small, the electric power consumed by the LEDs is small, and the quantity of heat generated in the LEDs is small. The number of LEDs used in each light-emitting device can be determined suitably in consideration of the size of the region indicated by each light-emitting device, the required luminance, etc. The LEDs are not particularly limited in kind. For example, the LEDs can be selected from known type LEDs such as round type LEDs, SMD type LEDs, etc.

On the other hand, a bulb may be used as one of light sources for the first light-emitting device and/or the second light-emitting device. In this case, use of a lens with a color (color filter) is required for obtaining a desired emission color. When, for example, a bulb is used as the light source for the first light-emitting device, a front or rear surface of the first light-emitting device may be coated with red color so that the color of the light source can be changed.

In the invention, the light emitting devices can be also configured by: at least one short-wave LED; and a lens including a fluorescent material which generates fluorescence when the fluorescent material receives light from the short-wave LED.

According to this configuration, the fluorescent material generates fluorescence when excited by light emitted from the short-wave LED. That is, fluorescence is generated in the lens, so that such fluorescence is radiated from a surface of the lens as light in the form of a surface. This is because light is emitted in all directions from the fluorescent material while the light is diffused by the fluorescent material. In addition, light emitted from the short-wave LED is not observed as light emitted in the form of a point because the light itself from the LED is hardly recognized visually. In this manner, a vehicle lamp excellent in design characteristic can be provided by a simple configuration.

According to the invention, a stop lamp indication method is provided. The configuration of the method is as follows. A stop lamp indication method includes emitting two kinds of light in different colors, that is, red light and blue or green light, from a stop lamp indication region to thereby perform stop lamp indication.

On this occasion, first light-emitting device and second light-emitting device may be disposed in the stop lamp indication region so that the two of a red light and a light which is different from the red light are emitted from the first light-emitting device and the second light-emitting device respectively.

Preferably, the light which is different from the red light may be constituted by any of blue light and green light.

For stop lamp indication, the red light may be blinked. As a result, a signal indicating deceleration or stop can be given to the rear more effectively. In addition, the blue or green light may be preferably blinked. This is because the visibility improving effect can be made more remarkable by the blue or green light when the blue or green light is blinked. When the blue or green light is blinked, it is further preferable that control over lighting of the two kinds of light is made such that the red light is turned off while the blue or green light is turned on. According to this control, mixture of the red light and the blue or green light can be avoided. As a result, the red light can be made conspicuous by contrast between the two kinds of light. Hence, the effect of the invention for enhancing visibility in stop lamp indication can be made more remarkable. Moreover, the effect that visibility in peripheral view is improved by the blue or green light can be used more to advantage.

It is further preferable that the blue or green light is blinked instantaneously. According to this lighting control, high visibility (brightness) of the blue or green light can be used more effectively, so that improvement of the visibility can be attained more greatly.

When the blue or green light is turned on, luminance of the red light may be reduced to thereby reduce or prevent color mixture of the two kinds of light.

When both the red light and the blue or green light are blinked, it is preferable that the lighting time of the blue or green light is shorter than that of the red light. It is further preferable that the red light and the blue or green light are not turned on simultaneously. For example, the red light is turned on continuously in principle, but turned off only when the blue light needs to be turned on. When lighting control is made thus, mixture of the red light and the blue or green light can be avoided. Hence, the effect of indication using the red light (indication of the shape and color of the stop lamp by use of the red light which is the original emission color for stop lamp indication) and the effect of indication using the blue or green light (enhancement of visibility, especially, visibility in peripheral view) can be utilized to the utmost without making the both effects of indication be cancelled by each other. Control may be made so that the red light is emitted continuously while the blue or green light is blinked.

When the short-wave LEDs are provided as light sources, these short-wave LEDs are not particularly limited in kind. A known configuration such as a round type LED or an SMD type LED can be used as the short-wave LED. Here, the "short-wave LED" means an LED capable of emitting light at a short wavelength (which is light exhibiting a peak emission wavelength in a wavelength range of from 380 nm to 450 nm and which will be hereinafter referred to as "short-wave light"). For example, an LED exhibiting a main emission peak wavelength in a wavelength range of from 360 nm to 450 nm or an LED exhibiting a main emission peak wavelength in a wavelength range of from 360 nm to 410 nm may be used as the short-wave LED. Preferably, an LED exhibiting a main emission peak wavelength in a wavelength range of from 360 nm to 400 nm may be used as the short-wave LED. When such a short-wave LED is used, the fluorescent material (which will be described later) can be excited to generate fluorescence with high efficiency. An LED additionally exhibiting at least one emission peak wavelength in a wavelength range different from the aforementioned wavelength range may be used as the short-wave LED. Further, an LED exhibiting a plurality of peak emission wavelengths in the aforementioned wavelength range may be used as the short-wave LED.

The short-wave LED is preferably selected in consideration of the excitation peak of the (inorganic or organic) fluorescent material (which will be described later). In other words, when a short-wave LED exhibiting a main emission peak at a wavelength near the excitation peak of the fluorescent material is selected, the fluorescent material can be excited to generate fluorescence with high luminance to thereby make the fluorescence illuminate each indication portion effectively.

The material for forming the short-wave LED is not particularly limited. An LED constituted by a light-emitting element having Group III nitride compound semiconductor layers may be used as the short-wave LED. Here, Group III nitride compound semiconductors used in the Group III nitride compound semiconductor layers are represented by the general formula $Al_XGa_YIn_{1-X-Y}N$ ($0 \leq X \leq 1$, $0 \leq Y \leq 1$, $0 \leq X+Y \leq 1$), which includes so-called binary compounds such as AlN, GaN and InN, and so-called ternary compounds such as $Al_xGa_{1-x}N$, $Al_xIn_{1-x}N$ and $Ga_xIn_{1-x}N$ ($0<x<1$). The group III elements may be partially replaced by boron (B), thallium (Tl), etc. The nitrogen (N) maybe partially replaced by phosphorus (P), arsenic (As), antimony (Sb), bismuth (Bi), etc. An element-functional portion of the light-emitting element is preferably made of a Group III nitride compound semiconductor selected from the binary and ternary compounds.

Each of the Group III nitride compound semiconductors may contain any optional dopant. Si, Ge, Se, Te, C, etc. may be used as n-type impurities. Mg, Zn, Be, Ca, Sr, Ba, etc. may be used as p-type impurities. After doped with p-type impurities, the Group III nitride compound semiconductor may be subjected to electron beam irradiation, plasma irradiation or heating in a furnace. This step is not always essential.

The Group III nitride compound semiconductor may be formed by a metal organic chemical vapor deposition method (MOCVD method) or may be formed by a known method such as a molecular beam epitaxy method (MBE method), a halide vapor phase epitaxy method (HVPE method), a sputtering method, an ion-plating method, and an electron shower method.

The lens is disposed in a position irradiated with light emitted from the short-wave LED. The lens includes a fluorescent material which generates fluorescence when the fluorescent material receives light from the short-wave LED.

A material generating fluorescence when excited by short-wave light is used as the fluorescent material. A material generating fluorescence in a color corresponding to each of indication portions (such as a tail stop lamp portion and a turn lamp portion in a rear combination lamp) is selected suitably as the fluorescent material. For example, a fluorescent material exhibiting red fluorescence can be preferably adapted to the tail stop lamp portion, and a fluorescent material exhibiting yellow fluorescence can be preferably adapted to the turn lamp portion.

In addition, two or more kinds of fluorescent materials (inclusive of fluorescent materials in one fluorescent color and fluorescent materials in different fluorescent colors) may be used for obtaining a desired emission color.

A known fluorescent substance can be used as the fluorescent material. An inorganic or organic fluorescent substance can be used without limitation. Examples of the inorganic fluorescent substance which can be used include: fluorescent substances exhibiting red emission color, such as $6MgO \cdot As_2O_5:Mn^{4+}$, $Y(PV)O_4:Eu$, $CaLa_{0.1}Eu_{0.9}Ga_3O_7$, $BaY_{0.9}Sm_{0.1}Ga_3O_7$, $Ca(Y_{0.5}Eu_{0.5})(Ga_{0.5}In_{0.5})_3O_7$, $Y_3O_3:Eu$, $YVO_4:Eu$, $Y_2O_2:Eu$, $3.5MgO \cdot 0.5MgF_2 \cdot GeO_2:Mn^{4+}$, and $(Y.Cd)BO_2:Eu$; fluorescent substances exhibiting blue emission color, such as $(Ba, Ca, Mg)_5(PO_4)_3Cl:Eu^{2+}$, $(Ba, Mg)_2Al_{16}O_{27}:EU^{2+}$, $Ba_3MgSi_2O_8:Eu^{2+}$, $BaMg_2Al_{16}O_{27}:Eu^{2+}$, $(Sr, Ca)_{10}(PO_4)_6Cl_2:Eu^{2+}$, $(Sr, Ca)_{10}(PO_4)_6Cl_2 \cdot nB_2O_3:Eu^{2+}$, $Sr_{10}(PO_4)_6Cl_2:Eu^{2+}$, $(Sr, Ba, Ca)_5(PO_4)_3Cl:Eu^{2+}$, $Sr_2P_2O_7:Eu$, $Sr_5(PO_4)_3Cl:Eu$, $(Sr, Ba, Ca)_3(PO_4)_6Cl:Eu$, $SrO \cdot P_2O_5 \cdot B_2O_5:Eu$, $(BaCa)_5(PO_4)_3Cl:Eu$, $SrLa_{0.95}Tm_{0.05}Ga_3O_7$, $ZnS:Ag$, $GaWO_4$, $Y_2SiO_6:Ce$, $ZnS:Ag$, $Ga$, $Cl$, $Ca_2B_4OCl:Eu^{2+}$, $BaMgAl_4O_3:Eu^{2+}$, and fluorescent substances represented by the general formula $(M1, Eu)_{10}(PO_4)_6Cl_2$ (in which M1 is at least one kind of element selected from the group consisting of Mg, Ca, Sr, and Ba); and fluorescent substances exhibiting green emission color, such as $Y_2SiO_5:Ce^{3+}$, $Tb^{3+}$, $Sr_2Si_3O_8 \cdot 2SrCl_2:Eu$, $BaMg_2Al_{16}O_{27}:Eu^{2+}$, $Mn^{2+}$, $ZnSiO_4:Mn$, $Zn_2SiO_4:Mn$, $LaPO_4:Tb$, $SrAl_2O_4:Eu$, $SrLa_{0.2}Tb_{0.8}Ga_3O_7$, $Ca_{0.9}YPr_{0.1}Ga_3O_7$, $ZnGd_{0.8}Ho_{0.2}Ga_3O_7$, $SrLa_{0.6}Tb_{0.4}Al_3O_7$, $ZnS:Cu$, $Al$, $(Zn, Cd)S:Cu$, $Al$, $ZnS:Cu$, $Au$, $Al$, $Zn_2SiO_4:Mn$, $ZnSiO_4:Mn$, $ZnS:Ag$, $Cu$, $(Zn.Cd)S:Cu$, $ZnS:Cu$, $GdOS:Tb$, $LaOS:Tb$, $YSiO_4:Ce.Tb$, $ZnGeO_4:Mn$, $GeMgAlO:Tb$, $SrGaS:Eu^{2+}$, $ZnS:Cu.Co$, $MgO \cdot nB_2O_3:Ge$, $Tb$, $LaOBr:Tb$, $Tm$, and $La_2O_2S:Tb$. Further, $YVO_4:Dy$ exhibiting white emission color or $CaLu_{0.5}Dy_{0.5}Ga_3O_7$ exhibiting yellow emission color may be used.

Examples of the organic fluorescent substance which can be used include: stilbene pigments such as 1,4-bis(2-methylstyryl)benzene (Bis-MSB) and trans-4,4'-diphenylstilbene (DPS); coumarin pigments such as 7-hydroxy-4-methylcoumarin (coumarin 4); BOQP; PBBO; BOT; and POPOP. Each of these fluorescent substances exhibits blue emission color. Further, DPOT, brilliantsulfoflavine FF, basic yellow HG, SINLOIHI COLOR FZ-5005 (made by Sinloihi Co., Ltd.), etc. may be used as the organic fluorescent substance. Each of these fluorescent substances exhibits yellow or green fluorescence. Further, eosine, rhodamine 6G, rhodamine B, NKP-8303 (made by Nippon Keiko Kagaku Company), etc. may be used as the organic fluorescent substance. Each of these fluorescent substances exhibits yellow or red fluorescence. Further, polymethyl methacrylate (PMMA) obtained by polymerization and solidification of TB(EDTA)SSA, EuTTA, etc. dissolved, for example, in methyl methacrylate may be used.

The mode of containing the fluorescent material in the lens is not particularly limited. For example, a layer containing the fluorescent material may be formed in a surface of the lens. The fluorescent material may be applied or printed on a surface of the lens opposite to the LED or on a design surface of the lens so that a layer containing the fluorescent material can be formed in the surface of the lens. Alternatively, a sheet containing the fluorescent material may be stuck onto the surface of the lens. Although it is preferable that a layer containing the fluorescent material is formed on the whole surface of the lens, the invention may be applied also to the case where a layer containing the fluorescent material is formed on only one part of the lens surface.

The layer containing the fluorescent material is preferably formed on the lens surface side opposite to the LED so that the fluorescent material can be efficiently irradiated with light emitted from the LED. If the layer containing the fluorescent material is formed on the lens design surface side, the fluorescent material may be exposed to rain, dust, etc. This causes a problem of abrasion. The problem of abrasion can be, however, prevented when the layer containing the fluorescent material is formed on the lens surface side opposite to the LED.

The fluorescent material may be formed so as to be dispersed into the lens. For example, the fluorescent material may be mixed with a light-transparent resin material, and the mixture material may be molded into a lens shape to thereby produce a lens containing the fluorescent material dispersed therein.

Visible LEDs and/or bulbs may be used in combination with the short-wave LEDs as a light source. According to this measure, lamp indication is performed by combination of light emitted from the visible LEDs and/or bulbs and fluorescence generated from the fluorescent material excited by light emitted from the short-wave LEDs. In this case, control can be carried out such that the visible LEDs and/or bulbs in addition to the short-wave LEDs are turned on when light emission with high luminance is required and such that only the short-wave LED source is turned on when light emission with low luminance is required. The tail stop lamp portion of the rear combination lamp will be described as an example. When the vehicle is running ordinarily (in a state in which the tail lamp is indicated), the short-wave LEDs are turned on so that low-luminance indication can be performed by fluorescence generated from the fluorescent material. When the vehicle is decelerated (in a state in which the stop lamp is indicated), the visible LEDs and the short-wave LEDs are turned on simultaneously so that high-luminance indication can be performed by combination of light emitted from the visible LEDs and fluorescence generated from the fluorescent material.

When a bulb is disposed opposite to the center portion of the lens and short-wave LEDs are disposed opposite to the edge portion of the lens in the condition that the fluorescent material is contained at least in the edge portion of the lens, fluorescence generated from the fluorescent material can be used as externally radiating light in the edge portion of the lens which is not irradiated with light emitted from the bulb (or irradiated with a small quantity of light emitted from the bulb) and, accordingly, uniformity of luminance of externally radiating light can be attained on the whole surface of the lens.

For example, the vehicle lamp according to the invention may be applied to a rear combination lamp and to a single lamp such as a stop lamp, a back lamp, a turn lamp and a high mount stop lamp. Especially, the vehicle lamp can be preferably applied to a rear combination lamp.

Although it is necessary that LEDs in different colors are prepared in accordance with indication portions and control over lighting of these LEDs is carried out individually in the case where a rear combination lamp is formed by use of visible LEDs, short-wave LEDs can be used as light sources for all indication portions when the invention is applied to a rear combination lamp. Accordingly, the invention has the following advantages. That is, the number of kinds of parts can be reduced, the vehicle lamp can be assembled easily, and the lighting state can be controlled easily.

DETAILED DESCRIPTION OF THE DRAWINGS

DETAILED DESCRIPTION OF THE PREFERRED EMBODIMENTS

Figure 1:
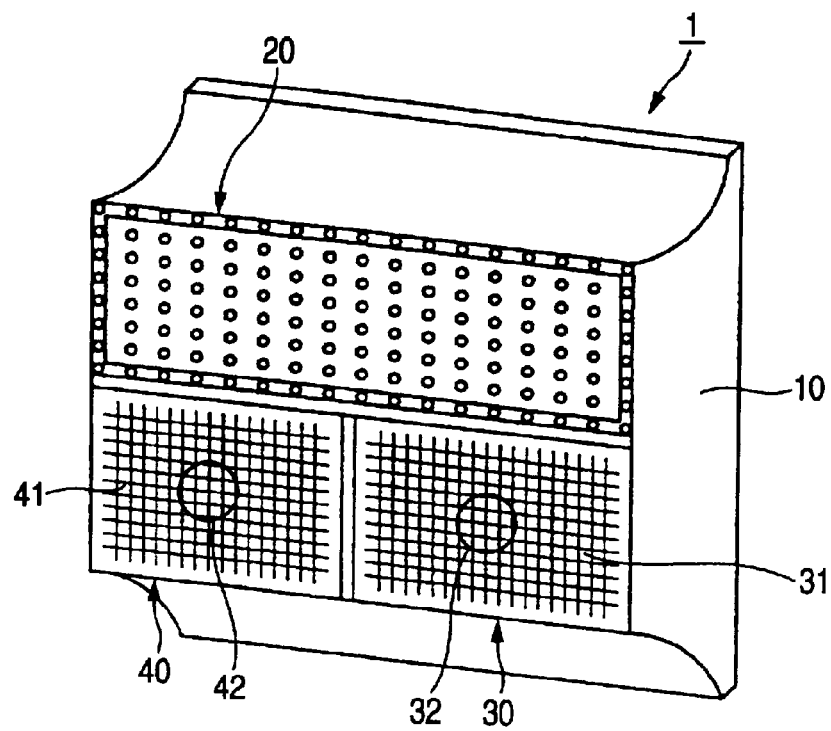
FIG. 1 is a perspective view showing a rear combination lamp 1 as an embodiment of the invention.

The invention will be described below in more detail in connection with its embodiments. FIG. 1 is a view showing a rear combination lamp 1 as an embodiment of the invention. The rear combination lamp 1 has a housing 10 provided with a mount portion attached to a car rear panel, a tail stop lamp portion 20 for performing tail lamp indication and stop lamp indication, a turn lamp portion 30 for performing turn lamp indication, and a back lamp portion 40 for performing back lamp indication. A lens 31 on a surface of the turn lamp portion 30 and a lens 41 on a surface of the back lamp portion 40 are colored with colors (in yellow, and colorless transparency or colorless semi-transparency) suitable for turn lamp indication and back lamp indication respectively. Inner surfaces of the lenses 31 and 41 are subjected to a desired cutting process so that light released from a bulb 32 and light released from a bulb 42 can be emitted more uniformly from outer surfaces of the lenses respectively.

Figure 2:
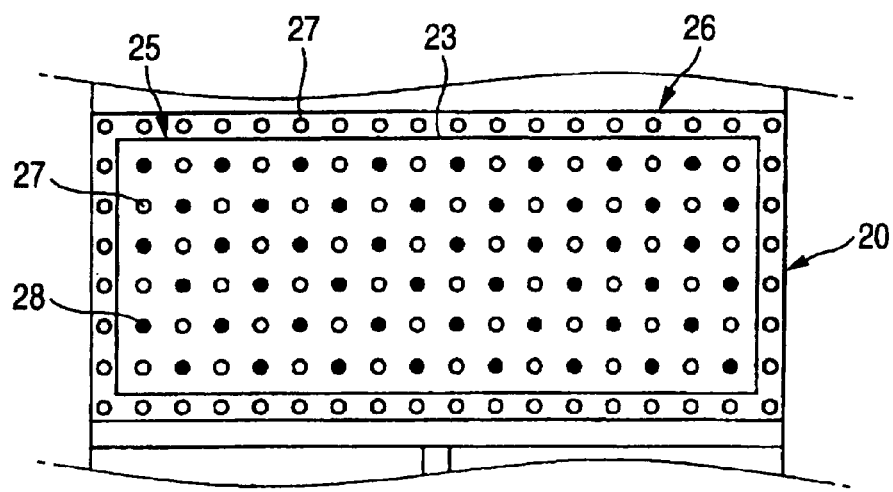
FIG. 2 is a partly enlarged view showing a tail stop lamp portion 20 of the rear combination lamp 1.
Figure 3:
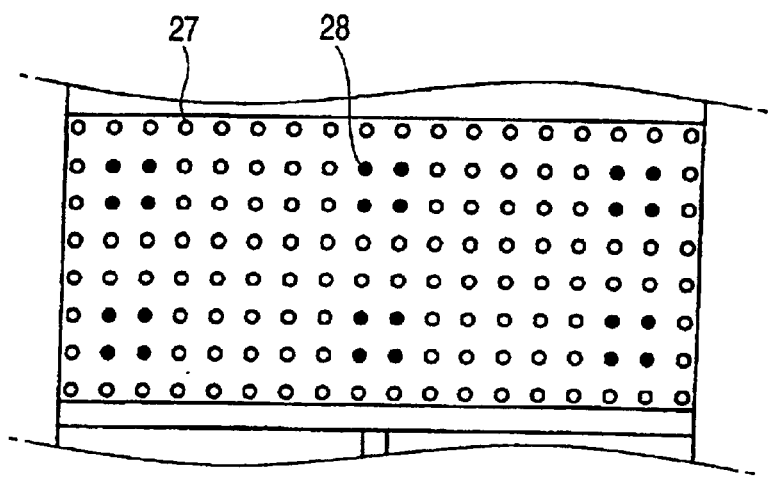
FIG. 3 is a view showing an example of the mode of arrangement of light sources (LEDs) in the tail stop lamp portion 20.

FIG. 2 is an enlarged view of the tail stop lamp portion 20. The tail stop lamp portion 20 is separated into two partitions 25 and 26 by a partition plate 23 having opposite specular surfaces. Red LEDs 27 and blue LEDs 28 are disposed alternately on a substrate in one 25 of the partitions, while red LEDs 27 are disposed linearly on a substrate in the other partition 26. Incidentally, a mode shown in FIG. 3 maybe used as the mode of arrangement of red LEDs 27 and blue LEDs 28. In the example shown in FIG. 3, blue LEDs 28 are disposed to be surrounded by red LEDs 27 so that the blue LEDs 28 are scattered like islands in the sea of the red LEDs 27.

Figure 4:
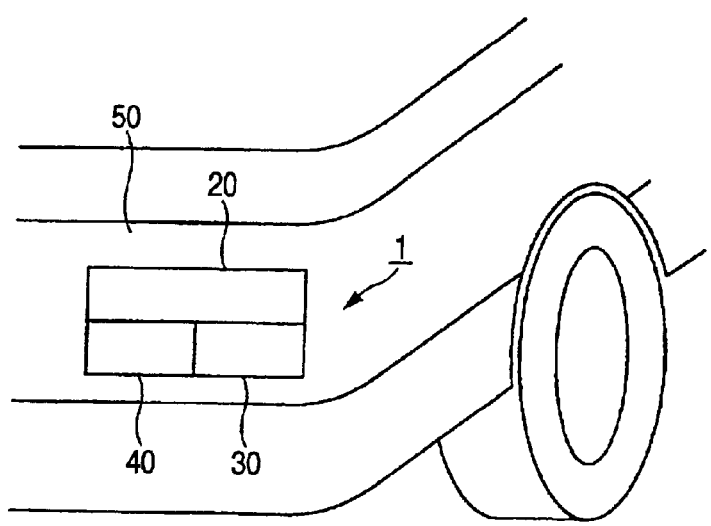
FIG. 4 is a perspective view showing the mode of use of the rear combination lamp 1.

FIG. 4 shows an example of use of the rear combination lamp 1. The rear combination lamp 1 is fixed to a rear panel 50 of a car through the mount portion of the housing 10.

The mode of tail lamp indication and the mode of stop lamp indication in the rear combination lamp 1 will be described below.

First, for tail lamp indication, the red LEDs 27 in the tail stop lamp portion 20 are partially turned on. As a result, red light with low luminance is emitted from the tail stop lamp portion 20. For stop lamp indication, the red LEDs 27 in the tail stop lamp portion 20 are wholly turned on. At the same time, the blue LEDs 28 are blinked at regular time intervals. Further, control over the lighting state of the two kinds of LEDs is made such that the red LEDs 27 are turned off in synchronism with the lighting of the blue LEDs 28.

When lighting control is made thus, the tail stop lamp portion 20 is wholly indicated by light emitted from the red LEDs 27 so that a viewer can recognize the shape of the tail stop lamp portion 20 by the red light. Moreover, color rendering characteristic in stop lamp indication is enhanced by combination of the red light and the blue light, so that stop lamp indication can be performed effectively. Moreover, because the blue light exhibiting high visibility in peripheral view is used, visibility can be improved particularly when stop lamp indication is recognized in peripheral view. In addition, color mixture of the blue light emitted from the blue LEDs 28 and the red light emitted from the red LEDs 27 can be avoided, so that the effects of the two kinds of light can be exerted to the utmost.

All the red LEDs 27 need not be turned off in synchronism with the lighting of the blue LEDs 28. For example, only red LEDs 27 adjacent to the blue LEDs 28 may be turned off.

On this occasion, the red LEDs 27 may be blinked during stop lamp indication. According to this configuration, red light blinked is observed, so that stop lamp indication can be performed effectively. In this case, it is preferable that the lighting time of the red LEDs 27 is longer than that of the blue LEDs 28. In other words, it is preferable that the lighting time of the blue LEDs 28 is shorter than that of the red LEDs 27. According to this configuration, light from the blue LEDs 28 is observed instantaneously, so that the high visibility of the blue light can be used more effectively. Hence, visibility in stop lamp indication can be enhanced more greatly.

Although the embodiment has been described upon the case where each of turn lamp indication and back lamp indication is performed by use of a bulb, the invention may be applied also to the case where each of these indications is performed by use of LEDs. Further, LEDs capable of emitting light in a plurality of colors may be used as light sources for each of the indications (tail stop lamp indication, turn lamp indication and back lamp indication).

Figure 5:
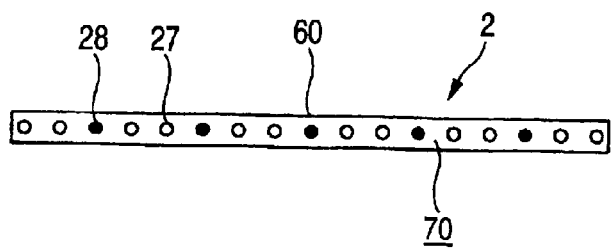
FIG. 5 is a plan view showing a high mount stop lamp 2 as another embodiment of the invention.

FIG. 5 shows a high mount stop lamp 2 as another embodiment of the invention. In the high mount stop lamp 2, parts the same as those in the embodiment described above are referred to by the same numerals as those in the embodiment described above for the sake of omission of duplicated description.

The high mount stop lamp 2 has a housing 60, red LEDs 27, blue LEDs 28, and a lens 70. As shown in FIG. 5, the red and blue LEDs 27 and 28 are disposed on a substrate provided in the housing 60 so that one blue LED 28 is located every two red LEDs 27.

Figure 6:
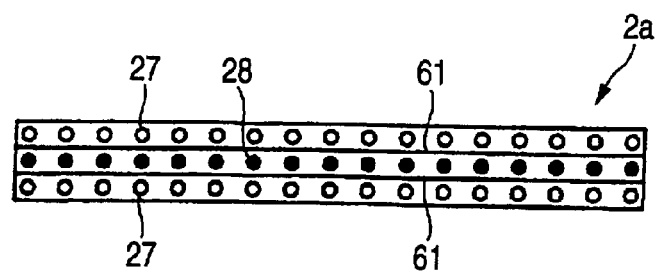
FIG. 6 is a view showing an example of the mode of arrangement of light sources (LEDs) in the high mount stop lamp according to this embodiment.
Figure 7:
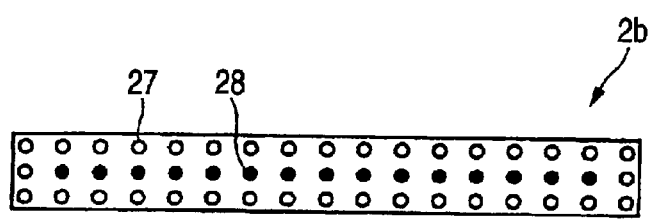
FIG. 7 is a view showing another example of the mode of arrangement of light sources (LEDs) in the high mount stop lamp according to this embodiment.

The mode of arrangement of the red LEDs 27 and the blue LEDs 28 is not limited to the mode shown in FIG. 5. For example, the mode shown in FIG. 6 or the mode shown in FIG. 7 may be used. In the example shown in FIG. 6, partition plates 61 are used. Blue LEDs 28 are disposed linearly in the center portion surrounded by the partition plates 61. Red LEDs 27 are disposed so that a layer of the blue LEDs 28 is sandwiched between upper and lower layers of the red LEDs 27. On the other hand, in the example shown in FIG. 7, red LEDs 27 are disposed in an outer circumferential portion of a high mount stop lamp 2b, so that blue LEDs 28 are disposed to be surrounded by the red LEDs 27.

Figure 8:
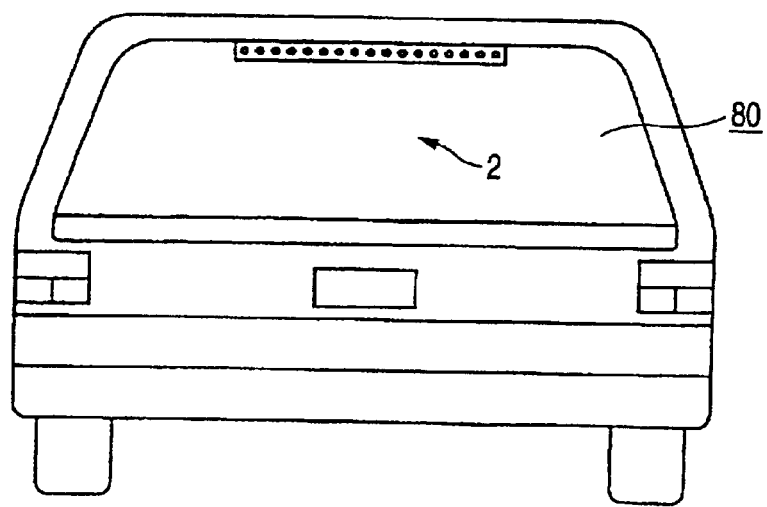
FIG. 8 is a plan view showing the mode of use of the high mount stop lamp 2.

As shown in FIG. 8, the high mount stop lamp 2 is used after it is mounted on rear glass 80.

The mode of lighting of the high mount stop lamp 2 will be described below. First, the red LEDs 27 are interlocked with a braking operation so as to be turned on. During the braking operation, the red LEDs 27 emit light continuously. The blue LEDs 28 are also interlocked with the braking operation so as to be turned on. During the braking operation, the blue LEDs 28 emit light blinked. As a result, during the braking operation, red light is observed from the high mount stop lamp 2 and, at the same time, blue light blinked at regular time intervals is observed. The visibility of the red light is improved by contrast between the red light and the blue light, so that stop lamp indication is performed effectively. Moreover, visibility in stop lamp indication is improved by the high visibility of the blue light. Particularly, visibility in peripheral view is improved. Incidentally, the red LEDs 27 may emit light blinked in the same manner as in the embodiment described above or may be turned off in synchronism with the lighting of the blue LEDs 28.

Figure 9:
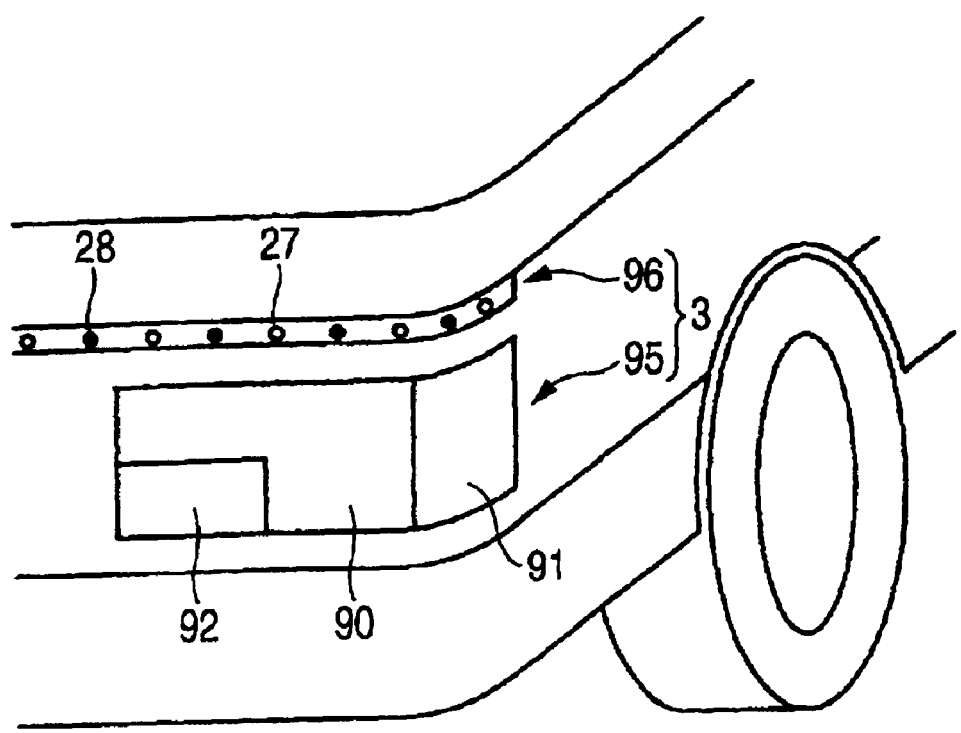
FIG. 9 is a perspective view showing a mode of use of a rear combination lamp 3 as a further embodiment of the invention.

A rear combination lamp 3 as a further embodiment of the invention will be described below. FIG. 9 shows a state in which the rear combination lamp 3 is used. The rear combination lamp 3 has a combination lamp 95, and an auxiliary lamp 96 provided separately from the combination lamp 95. The combination lamp 95 has a tail stop lamp portion 90, a turn lamp portion 91, and a back lamp portion 92. A red lens, a yellow lens and a transparent and colorless (or semitransparent and colorless) lens are used in the respective indication portions (the tail stop lamp portion 90, the turn lamp portion 91 and the back lamp portion 92) of the combination lamp 95. A bulb is used as a light source for each of the indication portions.

The auxiliary lamp 96 is constituted by a combination of red LEDs 27 and blue LEDs 28 which are arranged so as to fringe the rear panel. The red LEDs 27 and the blue LEDs 28 are disposed alternately.

In the rear combination lamp 3, the bulb in the tail stop lamp portion 90 of the combination lamp 95 is interlocked with a braking operation so as to be turned on. As a result, red light colored by the lens is observed from a surface of the tail stop lamp portion. In combination with the bulb, the red LEDs 27 in the auxiliary lamp 96 are turned on. On the other hand, the blue LEDs 28 in the auxiliary lamp 96 are blinked at regular time intervals during the braking operation. Further, the red LEDs 27 in the auxiliary lamp 96 are turned off in synchronism with the lighting of the blue LEDs 28.

According to this lighting control, effective stop lamp indication is performed by contrast between the blue light emitted from the blue LEDs 28 in the auxiliary lamp 96 and the combination of the red light emitted from the red LEDs 27 in the auxiliary lamp 96 and the red light emitted from the tail stop lamp portion 90. Moreover, because the red LEDs 27 are turned off while the blue LEDs 28 are turned on, color mixture of the blue light and the red light can be avoided in the auxiliary lamp 96. Hence, the effect for improvement of visibility by use of such blue light, especially, the effect for improvement of visibility in peripheral view, can be used more to advantage.

Figure 10:
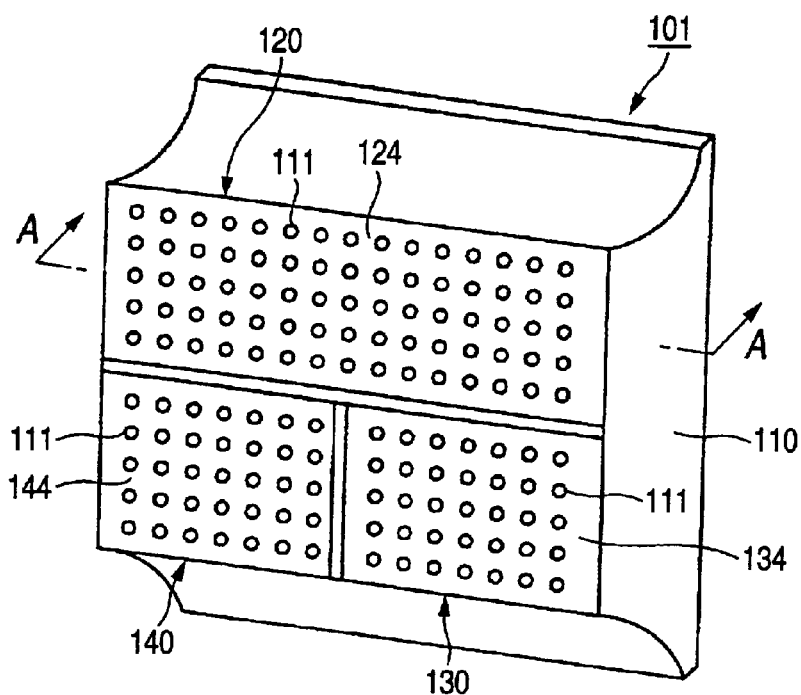
FIG. 10 is a view showing a rear combination lamp 101 as an embodiment of the invention.

The configuration of another aspect of the invention will be described below in more detail in connection with FIGS. 10 through 17. FIG. 10 is a view showing a rear combination lamp 101 as an embodiment of the invention where short-wave LEDs are provided as light sources. The rear combination lamp 101 has a housing 110 provided with a mount portion attached to a car rear panel, a tail stop lamp portion 120 for performing tail lamp indication and stop lamp indication, a turn lamp portion 130 for performing turn lamp indication, and a back lamp portion 140 for performing back lamp indication.

Figure 11:
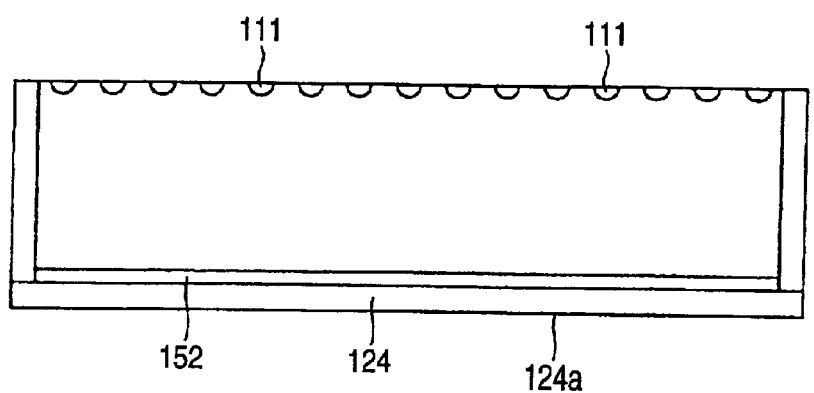
FIG. 11 is a sectional view taken along the line A—A in FIG. 10.

FIG. 11 is a sectional view taken along the line A—A in FIG. 10. As shown in FIG. 11, a film 152 containing a red fluorescent substance is stuck onto a rear surface (that is, a surface opposite to LEDs 111) of a lens 124 with which the tail stop lamp portion 120 is covered. Similarly, a film containing a yellow fluorescent substance is stuck onto a rear surface of a lens 134 with which the turn lamp portion 130 is covered. Further similarly, a film containing three kinds of fluorescence substances, that is, red, green and blue fluorescent substances, is stuck onto a rear surface of a lens 144 with which the back lamp portion 140 is covered. The short-wave LEDs 111 are disposed in the form of a matrix on a substrate which is disposed in each of partitions constituting indication portions in the housing.

FIG. 4 shows an example of use of the rear combination lamp 101. The rear combination lamp 101 is fixed to the car rear panel through the mount portion of the housing 110.

The mode of light emission in the rear combination lamp 101 configured as described above will be described below taking the case of stop lamp indication as an example. First, the short-wave LEDs 111 in the tail stop lamp portion are interlocked with a driver's braking operation so as to be turned on. The film 152 on the rear surface of the lens 124 is irradiated with short-wave light emitted from the short-wave LEDs 111, so that the fluorescent substance contained in the film is excited by the short-wave light. As a result, fluorescence is generated from the fluorescent substance. The fluorescence is radiated out through the film 152 and the lens 124. Hence, red light can be observed from the design surface 124a of the lens 124. On this occasion, the fluorescence generated from the fluorescent substance is low in directivity and the fluorescent substance itself functions as a light-diffusing agent. Hence, the light emitted through the film 152 and the lens 124 serves as surface light in which luminance is made uniform on the whole design surface 124a of the lens 124. That is, surface light with little luminance unevenness can be observed on the whole design surface 124a of the lens 124, so that stop lamp indication can be performed with excellent design characteristic.

Figure 12:
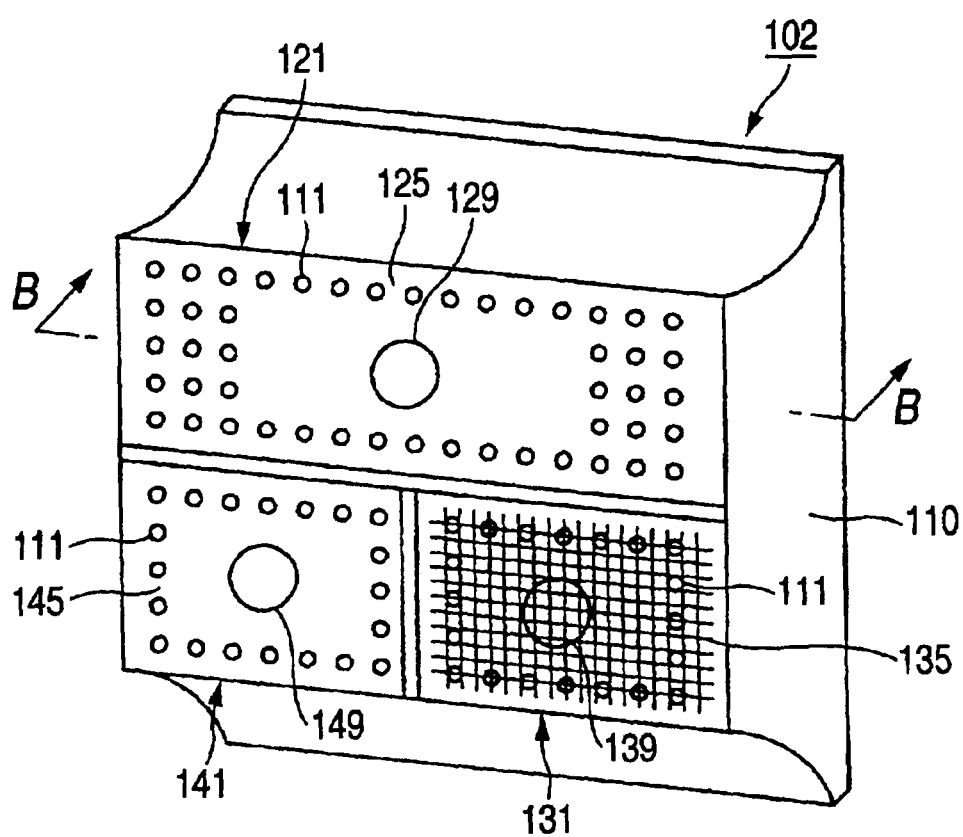
FIG. 12 is a view showing a rear combination lamp 102 as another embodiment of the invention.

FIG. 12 is a view showing a rear combination lamp 102 as another embodiment of the invention. Parts the same as those in the rear combination lamp 101 shown in FIG. 10 are referred to by the same numerals as those in FIG. 10 for the sake of omission of duplicated description.

The lens 125 in the tail stop lamp portion 121 and the lens 135 in the turn lamp portion 131 are colored with colors (red and yellow) suitable for tail stop lamp indication and turn lamp indication respectively. The lens 145 in the back lamp portion 141 is subjected to a cutting process.

Figure 13:
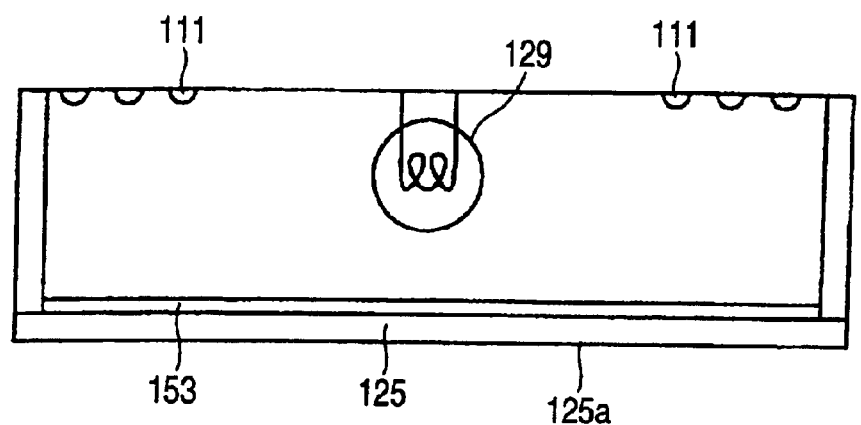
FIG. 13 is a sectional view taken along the line B—B in FIG. 12.

FIG. 13 is a sectional view taken along the line B—B in FIG. 12. Bulbs 129, 139 and 149 are disposed opposite to the substantially center portions of the lenses 125, 135 and 145 in the indication portions respectively. On the other hand, short-wave LEDs 111 are disposed in the form of a matrix in the surroundings of each of the bulbs 129, 139 and 149. As shown in FIG. 13, a film 153 containing a red fluorescent substance is stuck onto a rear surface of the lens 125 in the tail stop lamp portion 121. Similarly, a film containing a yellow fluorescent substance is stuck onto a rear surface of the lens 135. Further similarly, a film containing three kinds of fluorescent substances, that is, red, green and blue fluorescent substances, is stuck onto a rear surface of the lens 145.

The mode of light emission in the rear combination lamp 102 configured as described above will be described below taking the case of stop lamp indication as an example. First, the bulb 129 and the short-wave LEDs 111 in the tail stop lamp portion are interlocked with a driver's braking operation so as to be turned on. Light emitted from the bulb 129 is colored with the lens color (red) when the light passes through the lens 125. On the other hand, the film 153 is irradiated with short-wave light emitted from the short-wave LEDs 111, so that the fluorescent substance contained in the film is excited by the short-wave light. As a result, fluorescence is generated from the fluorescent substance. The fluorescence is radiated out through the film 153 and the lens 125. Hence, both red light caused by the bulb 129 and red light caused by the fluorescent substance can be observed from the design surface 125a of the lens 125. On this occasion, the light emitted from the bulb 129 is mainly released from the center portion of the lens design surface 125a. That is, the light caused by the bulb is in short supply from the edge portion of the lens design surface 125a. The light caused by the fluorescent substance is, however, released from the edge portion of the lens to compensate for short supply of light from the edge portion. In this manner, the light caused by the bulb is radiated mainly from the center portion of the lens 125 while the light caused by the fluorescent substance is radiated from the edge portion of the lens 125. Hence, light emission unevenness in the lens design surface 125a can be reduced. Accordingly, stop lamp indication can be performed with excellent design characteristic.

Figure 14:
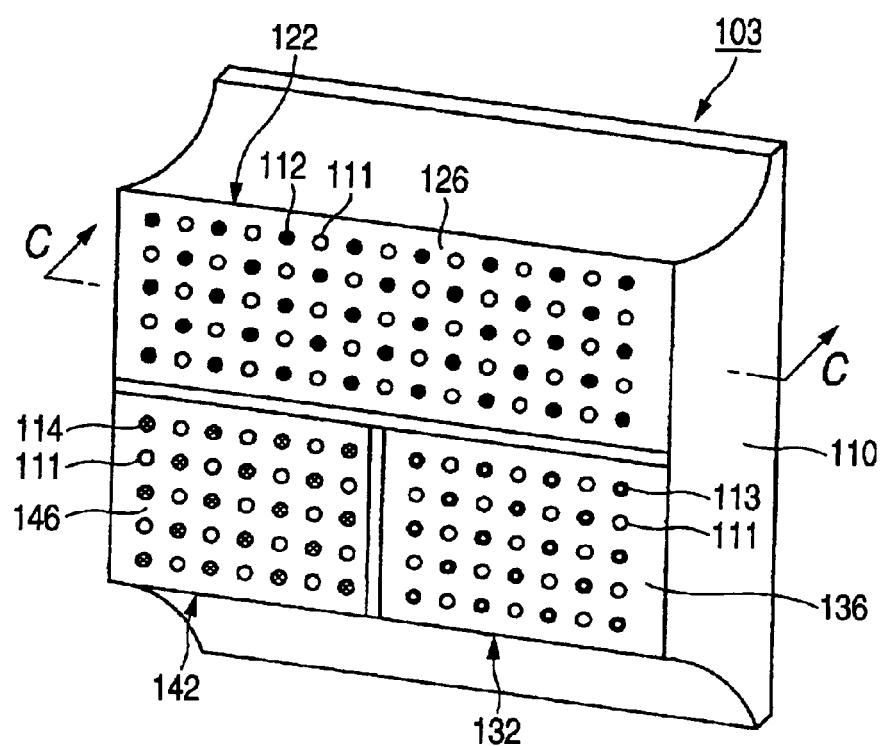
FIG. 14 is a view showing a rear combination lamp 103 as a further embodiment of the invention.

FIG. 14 is a view showing a rear combination lamp 103 as a further embodiment of the invention. Parts the same as those in the rear combination lamp 101 shown in FIG. 10 are referred to by the same numerals as those in FIG. 10 for the sake of omission of duplicated description.

Figure 15:
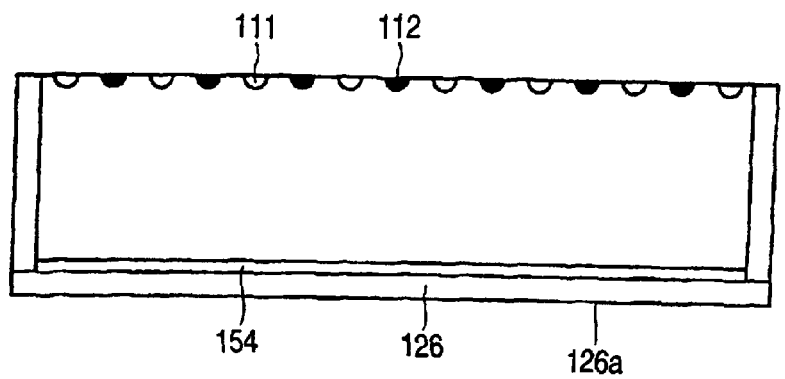
FIG. 15 is a sectional view taken along the line C—C in FIG. 14.

FIG. 15 is a sectional view taken along the line C—C in FIG. 14. As shown in FIG. 15, a film 154 containing a red fluorescent substance is stuck onto a rear surface of a lens 126 in a tail stop lamp portion 122. Similarly, a film containing a yellow fluorescent substance is stuck onto a rear surface of a lens 136 in a turn lamp portion 132. Further similarly, a film containing three kinds of fluorescent substances, that is, red, green and blue fluorescent substances, is stuck onto a rear surface of a lens 146 in a back lamp portion 142.

Short-wave LEDs 111 and red LEDs 112 are disposed alternately on a substrate disposed in the tail stop lamp portion 122. Similarly, short-wave LEDs 111 and yellow LEDs 113 are disposed alternately on a substrate disposed in the turn lamp portion 132. Further similarly, short-wave LEDs 111 and white LEDs 114 are disposed alternately on a substrate disposed in the back lamp portion 142.

The mode of light emission in the rear combination lamp 103 configured as described above will be described below taking the case of tail lamp indication and stop lamp indication as an example. First, the short-wave LEDs 111 in the tail stop lamp portion 122 are turned on in synchronism with the lighting of clearance lamps. The film 154 on the rear surface of the lens 126 is irradiated with short-wave light emitted from the short-wave LEDs 111, so that the fluorescent substance contained in the film is excited by the short-wave light. As a result, fluorescence is generated from the fluorescent substance. The fluorescence is radiated out through the film 154 and the lens 126. Hence, red light can be observed from the design surface 126a of the lens 126. Accordingly, tail lamp indication can be performed.

When stop lamp indication is performed, the short-wave LEDs 111 and the red LEDs 112 in the tail stop lamp portion 122 are turned on simultaneously. As a result, both fluorescence caused by short-wave light emitted from the short-wave LEDs 111 and light emitted from the red LEDs 112 are radiated from the design surface 126a of the lens 126. Hence, the light released from the design surface 126a of the lens 126 is high in luminance compared with the case of tail lamp indication. Accordingly, stop lamp indication can be performed effectively.

Figure 16:
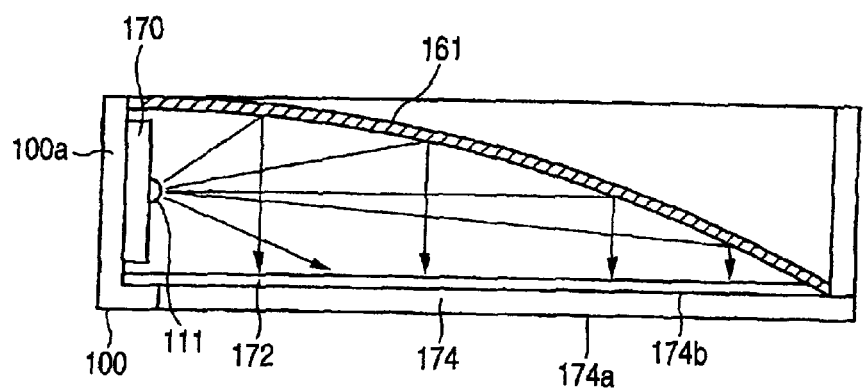
FIG. 16 is a sectional view of a tail stop lamp portion of a rear combination lamp as a further embodiment of the invention.

Although the embodiments have been described upon the case where short-wave LEDs are disposed opposite to the lens so that light is released from the short-wave LEDs directly to the lends side, the invention may be applied also to the case where a reflector is used as shown in FIG. 16. FIG. 16 is a sectional view of a tail stop lamp portion of a rear combination lamp like FIG. 11. Parts the same as those in FIG. 11 are referred to by the same numerals as those in FIG. 11 for the sake of omission of duplicated description. In the configuration shown in FIG. 16, a reflector 161 is disposed so as to be opposite to the rear surface 174b side of a lens 174. A substrate 171 is disposed on a side portion 100a of a housing 100. Short-wave LEDs 111 are disposed on the substrate 171. A film 172 containing a red fluorescent substance is stuck onto the rear surface 174b of the lens 174.

According to this configuration, short-wave light emitted from the short-wave LEDs 111 is reflected on the reflector 161 so as to travel toward the lens 174 side. The fluorescent substance contained in the film 172 is excited by the short-wave light. As a result, red light is radiated from the design surface 174a of the lens 174. The film 172 is directly irradiated with a part of light emitted from the short-wave LEDs 111.

Figure 17:
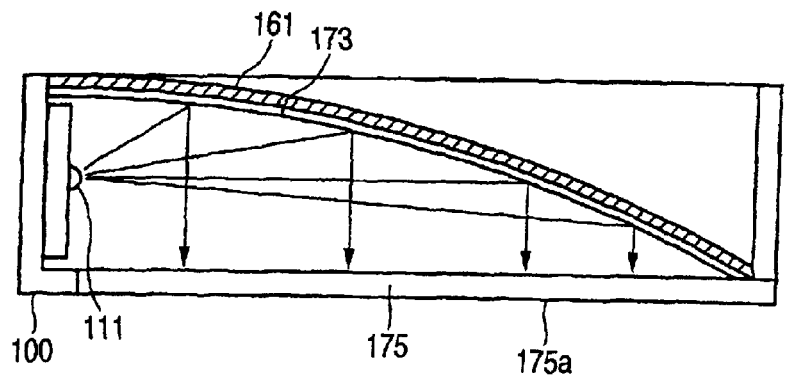
FIG. 17 is a sectional view of a tail stop lamp portion of a rear combination lamp as a further embodiment of the invention.

A film 173 containing a fluorescent substance may be stuck onto a surface (opposite to the lens) of the reflector 161 as shown in FIG. 17. According to this configuration, the fluorescent substance is excited by a part of light radiated from the short-wave LEDs 111 toward the reflector 161 when the part of light passes through the film 173. Fluorescence generated thus from the fluorescent substance is reflected by the reflector 161 so as to travel toward the lens 175. Finally, the light (fluorescence) is radiated from the lens design surface 175a.

On the other hand, a part of light emitted from the short-wave LEDs 111 is reflected by the reflector and then excites the fluorescent substance contained in the film.

In the configuration described above, the light irradiation range is widened because light emitted from the short-wave LEDs is reflected and dispersed by the reflector. Hence, light can be emitted from a larger area by a smaller number of short-wave LEDs.

The invention is not limited at all to the description of the mode for carrying out the invention and the description of the embodiments. The invention includes various modifications that can be conceived easily by those skilled in the art, without departing from the description of the scope of claims.

What is claimed is:

1. A vehicle rear lamp comprising:
a stop lamp comprising:
a first light-emitting device emitting a red light; and
a second light-emitting device emitting a light which is different from the red light,
wherein said first light-emitting device and said second light-emitting device are provided in a region for performing a stop lamp indication,
wherein at least one of the first light-emitting device and the second light-emitting device comprises:
at least one short-wave LED; and
a lens including a fluorescent material which generates fluorescence when said fluorescent material receives light from said short-wave LED, and
wherein said at least one of the first light-emitting device and the second light-emitting device further includes a bulb.

2. A vehicle rear lamp according to claim 1, wherein said short-wave LED exhibits a main emission peak wavelength in a wavelength range of not longer than 450 nm.

3. A vehicle rear lamp according to claim 1, wherein a layer including said fluorescent material is formed on a surface of said lens.

4. A vehicle rear lamp according to claim 1, wherein said vehicle rear lamp comprises a rear combination lamp.

5. A vehicle rear lamp according to claim 1, wherein at least one of said first light-emitting device and said second light-emitting device further comprises a reflector that reflects light emitted from said at least one short-wave LED toward said lens.

6. A vehicle rear lamp comprising:
a stop lamp including:
a first light-emitting device emitting a red light; and
a second light-emitting device emitting a light which is different from the red light,
wherein said first light-emitting device and said second light-emitting device are provided in a region for performing a stop lamp indication,
wherein at least one of the first light-emitting device and the second light-emitting device includes:
at least one short-wave LED; and
a lens including a fluorescent material which generates fluorescence when said fluorescent material receives light from said short-wave LED, wherein said vehicle rear lamp includes a rear combination lamp, and wherein said rear combination lamp includes said stop lamp, and at least one of a turn lamp that performs turn lamp indication and a back lamp that performs back lamp indication.

7. A vehicle rear lamp according to claim 6, wherein said at least one of said turn lamp and said back lamp comprises:

at least one short-wave LED; and a lens including a fluorescent material which generates fluorescence when said fluorescent material receives light from said short-wave LED.

8. A vehicle rear lamp according to claim 7, wherein a layer including said fluorescent material is formed on a surface of said lens.

9. A vehicle rear lamp comprising:

a rear combination lamp including:
   a light-emitting device that emits a light, and is disposed in a region that performs lamp indication,
   wherein the light-emitting device includes:
      at least one short-wave LED; and
      a lens including a fluorescent material that generates fluorescence when said fluorescent material receives light from said short-wave LED, and
   wherein said light-emitting device further includes a bulb.

10. A vehicle rear lamp according to claim 9, wherein a surface of said lens includes a layer comprising said fluorescent material.

11. A vehicle rear lamp according to claim 9, wherein at least a portion of a surface of said lens includes a layer comprising said fluorescent material.

12. A vehicle rear lamp according to claim 9, wherein said light-emitting device comprises a plurality of short-wave LEDs disposed in a matrix surrounding said bulb.

13. A vehicle rear lamp according to claim 9, wherein said fluorescent material comprises at least one of a red fluorescent material, a yellow fluorescent material, and a combination of red fluorescent materials, green fluorescent materials, and blue fluorescent materials.

14. A vehicle rear lamp according to claim 9, wherein said light-emitting device further comprises a reflector that reflects light emitted from said at least one short-wave LED toward said lens.

15. A vehicle rear lamp according to claim 14, wherein a surface of said reflector includes a layer comprising a fluorescent material.

16. A vehicle rear lamp comprising:

a rear combination lamp including:
   a light-emitting device that emits a light, and is disposed in a region that performs lamp indication,
   wherein the light-emitting device includes:
      at least one short-wave LED; and
      a lens including a fluorescent material that generates fluorescence when said fluorescent material receives light from said short-wave LED, and
   wherein said rear combination lamp includes at least one of a stop lamp that performs stop lamp indication, a turn lamp that performs turn lamp indication, and a back lamp that performs back lamp indication.

17. A vehicle rear lamp comprising:

a rear combination lamp including:
   a light-emitting device that emits a light, and is disposed in a region that performs lamp indication,
   wherein the light-emitting device includes:
      at least one short-wave LED; and
      a lens including a fluorescent material that generates fluorescence when said fluorescent material receives light from said short-wave LED, and
   wherein said light-emitting device further includes:
      a plurality of short-wave LEDs; and
      a plurality of red LEDs.

18. A vehicle rear lamp according to claim 17, wherein said plurality of short-wave LEDs are alternately disposed with said plurality of red LEDs.

19. A vehicle rear lamp comprising:

a rear combination lamp including:
   a light-emitting device that emits a light, and is disposed in a region that performs lamp indication,
   wherein the light-emitting device includes:
      at least one short-wave LED; and
      a lens including a fluorescent material that generates fluorescence when said fluorescent material receives light from said short-wave LED, and
   wherein said light-emitting device further includes:
      a plurality of short-wave LEDs; and
      a plurality of yellow LEDs.

20. A vehicle rear lamp according to claim 19, wherein said plurality of short-wave LEDs are alternately disposed with said plurality of yellow LEDs.

21. A vehicle rear lamp comprising:

a rear combination lamp including:
   a light-emitting device that emits a light, and is disposed in a region that performs lamp indication,
   wherein the light-emitting device includes:
      at least one short-wave LED; and
      a lens including a fluorescent material that generates fluorescence when said fluorescent material receives light from said short-wave LED, and
   wherein said light-emitting device further includes:
      a plurality of short-wave LEDs; and
      a plurality of white LEDs.

22. A vehicle rear lamp according to claim 21, wherein said plurality of short-wave LEDs are alternately disposed with said plurality of white LEDs.

* * * * *